United States Patent
Fang et al.

(10) Patent No.: US 12,378,414 B2
(45) Date of Patent: Aug. 5, 2025

(54) CURABLE ORGANOPOLYSILOXANE COMPOSITION, CURED PRODUCT, AND ELECTRIC/ELECTRONIC EQUIPMENT

(71) Applicants: DOW SILICONES CORPORATION, Midland, MI (US); DOW TORAY CO., LTD., Toyko (JP)

(72) Inventors: Lei Fang, Shanghai (CN); Chen Chen, Shanghai (CN); Yan Huang, Shanghai (CN); Masayuki Onishi, Ichihara (JP); Toyohiko Fujisawa, Ichihara (JP); Qi Chen, Shanghai (CN); Guijun Yang, Guangdong (CN)

(73) Assignees: DOW SILICONES CORPORATION, Midland, MI (US); DOW TORAY CO., LTD., Tokyo (JP)

( * ) Notice: Subject to any disclaimer, the term of this patent is extended or adjusted under 35 U.S.C. 154(b) by 797 days.

(21) Appl. No.: 17/629,858

(22) PCT Filed: Jul. 26, 2019

(86) PCT No.: PCT/CN2019/097918
§ 371 (c)(1),
(2) Date: Jan. 25, 2022

(87) PCT Pub. No.: WO2021/016743
PCT Pub. Date: Feb. 4, 2021

(65) Prior Publication Data
US 2022/0275206 A1 Sep. 1, 2022

(51) Int. Cl.
*C08L 83/04* (2006.01)

(52) U.S. Cl.
CPC ......... *C08L 83/04* (2013.01); *C08L 2205/025* (2013.01); *C08L 2205/035* (2013.01)

(58) Field of Classification Search
CPC .............. C08L 83/04; C08L 2205/025; C08L 2205/035
See application file for complete search history.

(56) References Cited

U.S. PATENT DOCUMENTS

| 6,451,870 | B1 | 9/2002 | DeCato et al. |
| 8,314,200 | B2 | 11/2012 | Jandke et al. |
| 2007/0100065 | A1 | 5/2007 | Iwata et al. |
| 2007/0249790 | A1 | 10/2007 | Kashiwagi et al. |
| 2013/0197139 | A1 | 8/2013 | Kobayashi et al. |
| 2016/0009954 | A1 | 1/2016 | Hanson |
| 2017/0058103 | A1 | 3/2017 | Fujisawa et al. |
| 2020/0347229 | A1 | 11/2020 | Fujisawa et al. |

FOREIGN PATENT DOCUMENTS

| CN | 102464887 A | 5/2012 |
| CN | 103342816 B | 10/2013 |
| CN | 107406677 A | 11/2017 |
| EP | 2639258 B1 | 4/2016 |
| JP | 2003327833 A | 11/2003 |
| WO | 2016138660 A1 | 9/2016 |
| WO | 2018043270 A1 | 3/2018 |

OTHER PUBLICATIONS

International Search Report for PCT/CN2019/097918 dated Mar. 26, 2020, 2 pages.
Machine assisted English translation of JP2003327833 obtained from https://patents.google.com/patent on Apr. 7, 2022, 10 pages.
Machine assisted English translation of CN102464887 obtained from https://patents.google.com/patent on Apr. 7, 2022, 10 pages.
Machine assisted English translation of CN103342816 obtained from https://patents.google.com/patent on Apr. 7, 2022, 13 pages.

*Primary Examiner* — Ling Siu Choi
*Assistant Examiner* — Andrea Wu
(74) *Attorney, Agent, or Firm* — WARNER NORCROSS + JUDD LLP

(57) ABSTRACT

A curable organopolysiloxane composition is provided. The curable organopolysiloxane composition comprises: (A) an organopolysiloxane having at least two alkenyl groups per molecule; (B) an organosiloxane having one silicon atom-bonded hydrogen atom per molecule and free of alkenyl groups and silicon atom-bonded alkoxy groups; (C) an organosiloxane having one silicon atom-bonded hydrogen atom and at least one silicon atom-bonded alkoxy group per molecule and free of alkenyl groups; (D) an organopolysiloxane having at least two silicon atom-bonded hydrogen atoms per molecule and free of alkenyl groups and silicon atom-bonded alkoxy groups; (E) a hydrosilylation reaction catalyst; and (F) a condensation reaction catalyst. The curable organopolysiloxane composition can be cured to form a cured product. The cured product generally exhibits an excellent adhesion property against various substrates without cracking and delamination occurring after a thermal shock test.

12 Claims, No Drawings

CURABLE ORGANOPOLYSILOXANE COMPOSITION, CURED PRODUCT, AND ELECTRIC/ELECTRONIC EQUIPMENT

CROSS-REFERENCE TO RELATED APPLICATIONS

This application is the U.S. National Stage of, and claims priority to and all advantages of, International Application No. PCT/CN2019/097918 filed on 26 Jul. 2019, the content of which is incorporated herein by reference.

TECHNICAL FIELD

The present invention relates to a curable organopolysiloxane composition, a cured produced thereof, and an electric/electronic equipment made therefrom.

BACKGROUND ART

Curable organopolysiloxane compositions are widely used as encapsulants or sealants of electric/electronic equipment, and they are required to exhibit excellent self-adhesiveness to substrates they contact during curing. In particular, the miniaturization, multiple purposes, compactification, and weight reduction of electric/electronic equipment have recently been required, shapes corresponding to various uses have become complicated, and adhesives used in adhesive forms different from conventional ones have been required.

Patent Document 1 proposes a curable organopolysiloxane composition comprising: an organopolysiloxane having at least two alkenyl groups per molecule, an organosiloxane having one silicon atom-bonded hydrogen atom and at least one trialkoxysilyl group per molecule, a chain or cyclic organopolysiloxane having at least two silicon atom-bonded hydrogen atoms per molecule, a chain organopolysiloxane having at least three silicon atom-bonded hydrogen atoms per molecule, a hydrosilylation reaction catalyst, a condensation reaction catalyst, and an adhesion promoter.

However, although the curable organopolysiloxane composition described in Patent Document 1 forms a cured product with good adhesion to a substrate, it has the problem that crack or delamination of the cure product occurs after a thermal shock test.

PRIOR ART DOCUMENTS

Patent Documents

Patent Document 1: International Publication No. WO 2018/043270 A1

SUMMARY OF INVENTION

Technical Problem

An object of the present invention is to provide a curable organopolysiloxane composition which can cure to form a cured product having excellent adhesion property against various substrates without occurring crack and delamination after a thermal shock test. Another object of the present invention is to provide a cured product free of crack and delamination after a thermal shock test.

Solution to Problem

The curable organopolysiloxane composition of the present invention comprises:

(A) 100 parts by mass of an organopolysiloxane having at least two alkenyl groups with 2 to 12 carbon atoms per molecule;
(B) 0.05 to 5 parts by mass of an organosiloxane having one silicon atom-bonded hydrogen atom per molecule and free of alkenyl groups and silicon atom-bonded alkoxy groups;
(C) 0.01 to 10 parts by mass of an organosiloxane having one silicon atom-bonded hydrogen atom and at least one silicon atom-bonded alkoxy group per molecule and free of alkenyl groups;
(D) 0.1 to 20 parts by mass of an organopolysiloxane having at least two silicon atom-bonded hydrogen atoms per molecule and free of alkenyl groups and silicon atom-bonded alkoxy groups;
(E) a catalytic amount of a hydrosilylation reaction catalyst; and
(F) a catalytic amount of a condensation reaction catalyst,
wherein a mole ratio of the silicon atom-bonded hydrogen atoms in components (B), (C) and (D) with respect to the alkenyl groups in component (A) is in a range of 0.2 to 0.9.

In various embodiments, component (B) is an organosiloxane represented by the following general formula:

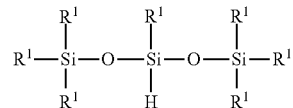

wherein each $R^1$ is the same or different monovalent hydrocarbon group with 1 to 12 carbon atoms and free of an aliphatic unsaturated bond.

In various embodiments, component (C) is an organosiloxane represented by the following general formula:

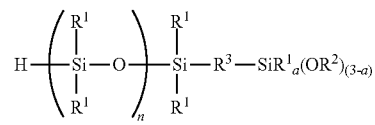

wherein each $R^1$ is as described above; each $R^2$ is the same or different alkyl group with 1 to 3 carbon atoms; $R^3$ is an alkylene group having 2 to 6 carbon atoms; "a" is 0, 1 or 2; and "n" is an integer of from 1 to 50.

In various embodiments, component (C) is an organosiloxane represented by the following formula:

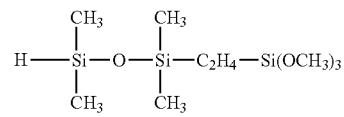

In various embodiments, the curable organopolysiloxane composition of the present invention further comprises:
(G) an adhesion promoter, in an amount of 0.1 to 10 parts by mass relative to 100 parts by mass of component (A).

In various embodiments, the curable organopolysiloxane composition of the present invention further comprises:
(H) an inorganic filler, in an amount of 1 to 200 parts by mass relative to 100 parts by mass of component (A).

In various embodiments, the curable organopolysiloxane composition of the present invention is used as an encapsulant or a sealant of an electric/electronic equipment.

The cured product of the present invention is obtained by curing the curable organopolysiloxane composition mentioned above.

In various embodiments, the cured product has a Shore 00 hardness of 10 to 60.

The electric/electronic equipment of the present invention comprises: a cured product obtained by curing the curable organopolysiloxane composition mentioned above.

Effects of Invention

The curable organopolysiloxane composition of the present invention can cure to form a cured product having excellent adhesion property against various substrates with occurring crack and delamination after a thermal shock test.

DETAILED DESCRIPTION OF THE INVENTION

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, the term "about" applies to both numerical values when associated with a range of values. Moreover, the term "about" may apply to numerical values even when not explicitly stated.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The curable organopolysiloxane composition of the present invention will be explained in detail.

Component (A) is an organopolysiloxane having at least two alkenyl groups with 2 to 12 carbon atoms per molecule. The alkenyl groups are exemplified by vinyl groups, allyl groups, butenyl groups, pentenyl groups, and hexenyl groups, but vinyl groups are preferred from the perspective of economic efficiency and reactivity. Silicon atom-bonded groups other than the alkenyl groups in component (A) are not limited, however, are exemplified by monovalent hydrocarbon groups with 1 to 12 carbon atoms which are free of aliphatic unsaturated bonds. The monovalent hydrocarbon groups are exemplified by methyl groups, ethyl groups, propyl groups, or similar alkyl group; phenyl groups, tolyl groups, xylyl groups, or similar aryl groups; benzyl groups, phenethyl groups, or similar aralkyl groups; and 3-chloropropyl groups, 3,3,3-trifluoropropyl groups, or similar halogenated alkyl groups, but methyl groups are preferred from the perspective of economic efficiency and heat resistance of the cured product.

While the molecular structure of component (A) is not particularly limited, examples thereof include a linear structure, partially branched linear structure, branched structure, cyclic structure, network structure, and dendritic structure. Component (A) may be a mixture of two or more having these molecular structures.

Moreover, while not particularly limited thereto, the viscosity of component (A) at 25° C. is, for example, preferably within the range of 20 to 1,000,000 mPa·s, particularly preferably within the range of 100 to 100,000 mPa·s. This is because, if the viscosity at 25° C. is not less than the lower limit of the abovementioned range, the physical properties of the obtained cured product, particularly flexibility and elongation, may significantly increase; in contrast, if it is not more than the upper limit of the abovementioned range, handleability of the obtained composition may increase. The viscosity is measured by using a rotational viscometer according to ASTM D 1084.

Examples of the organopolysiloxanes for component (A) include a copolymer of dimethylsiloxane and methylvinylsiloxane capped at both molecular chain terminals with trimethylsiloxy groups, a copolymer of dimethylsiloxane, methylvinylsiloxane and methylphenylsiloxane capped at both molecular chain terminals with trimethylsiloxy groups, a dimethylpolysiloxane capped at both molecular chain terminals with dimethylvinylsiloxy groups, a methylphenylpolysiloxane capped at both molecular chain terminals with dimethylvinylsiloxy groups, a copolymer of dimethylsiloxane and methylvinylsiloxane capped at both molecular chain terminals with dimethylvinylsiloxy groups, a copolymer of dimethylsiloxane and methylvinylsiloxane capped at both molecular chain terminals with dimethylphenylsiloxy groups, and a dimethylpolysiloxane capped at both molecular chain terminals with methylvinylphenylsiloxy groups.

Component (B) is a characteristic component according to the present invention and is an organosiloxane having one silicon atom-bonded hydrogen atom per molecule and free of alkenyl groups and silicon atom-bonded alkoxy groups. Silicon atom-bonded groups other than silicon atom-bonded hydrogen atom in component (B) are not limited, however, are exemplified by monovalent hydrocarbon groups with 1 to 12 carbon atoms which are free of aliphatic unsaturated bonds. Examples of the monovalent hydrocarbon groups include the groups described above.

While the molecular structure of component (B) is not particularly limited, examples thereof include a linear structure, partially branched linear structure, branched structure, cyclic structure, network structure, and dendritic structure.

In various embodiments, component (B) is an organosiloxane represented by the following general formula:

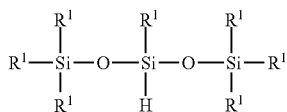

In the formula, each $R^1$ is the same or different monovalent hydrocarbon group with 1 to 12 carbon atoms and free of an aliphatic unsaturated bond. Examples of the monovalent hydrocarbon groups include the groups described above.

The content of component (B) is in a range of from about 0.01 to about 5 parts by mass, preferably in a range of from about 0.1 to about 5 parts by mass, alternatively in a range of from about 0.1 to about 3 parts by mass or alternatively in a range of from about 0.5 to about 2 parts by mass, per 100 parts by mass of component (A). This is because when the content of component (B) is not less than the lower limit of the aforementioned range, thermal shock stability of the cure product is improved, and when the content of component (B) is not more than the upper limit of the aforementioned range, curability of the composition is improved.

Component (C) is also a characteristic component according to the present invention and is an organosiloxane having one silicon atom-bonded hydrogen atom and at least one silicon atom-bonded alkoxy group per molecule and free of alkenyl groups. The alkoxy groups are exemplified by alkoxy groups with 1 to 3 carbon atoms such as methoxy groups, ethoxy groups, and propoxy groups, but methoxy groups are preferred from the perspective of reactivity. There are no limitations on the bonding position of the silicon atom-bonded alkoxy group in the organosiloxane, and the alkoxy group may be bonded to a silicon atom on the main chain or a silicon atom on a silylalkyl group bonded to a silicon atom on the main chain. The silicon atom-bonded alkoxy group is preferably in a portion of an alkoxysilylalkyl group. The alkoxysilylalkyl groups is preferably represented the following general formula:

—$R^3$—$SiR^1_a(OR^2)_{(3-a)}$.

In the formula, $R^1$ is a monovalent hydrocarbon group with 1 to 12 carbon atoms and free of an aliphatic unsaturated bond. Examples of the monovalent hydrocarbon groups include the groups described above.

In the formula, $R^2$ is an alkyl group with 1 to 3 carbon atoms. Examples of the alkyl groups include methyl groups, ethyl groups, and propyl groups, but methyl groups are preferred from the perspective of economic efficiency and reactivity.

In the formula, $R^3$ is an alkylene group with 2 to 6 carbon atoms. Examples of the alkylene groups include ethylene groups, propylene groups, butylene groups, and hexylene groups.

In the formula, "a" is 0, 1 or 2, alternatively 0.

Silicon atom-bonded groups other than silicon atom-bonded hydrogen atom and alkoxy groups in component (C) are not limited, however, are exemplified by monovalent hydrocarbon groups with 1 to 12 carbon atoms which are free of aliphatic unsaturated bonds. Examples of the monovalent hydrocarbon groups include the groups described above.

While the molecular structure of component (C) is not particularly limited, examples thereof include a linear structure, partially branched linear structure, branched structure, cyclic structure, network structure, and dendritic structure.

In various embodiments, component (C) is an organosiloxane represented by the following general formula:

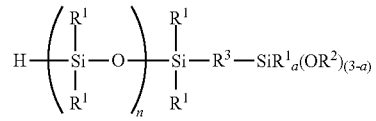

In the formula, $R^1$, $R^2$, $R^3$ and "a" are as mentioned above.

In the formula, "n" is an integer of from 1 to 50, preferably an integer of from 1 to 10, alternatively an integer of from 1 to 5. This is because when "n" is not more than the upper limit of the aforementioned range, reactivity of component (C) is improved, and adhesion property of the cured product is also improved.

Examples of this type of component (C) include organosiloxanes such as those mentioned below.

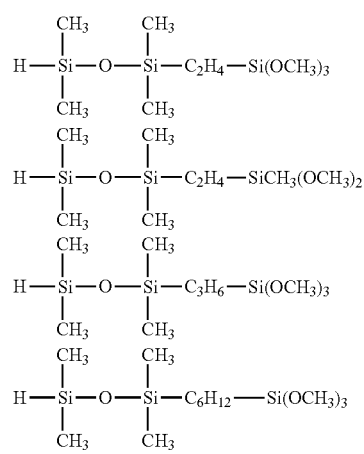

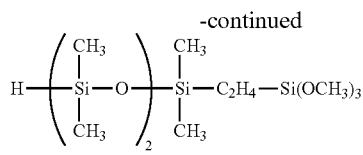

The content of component (C) is in a range of from about 0.01 to about 10 parts by mass, preferably in a range of from about 0.1 to about 5 parts by mass, alternatively in a range of from about 0.1 to about 3 parts by mass or alternatively in a range of from about 0.1 to about 2 parts by mass, per 100 parts by mass of component (A). This is because when the content of component (C) is not less than the lower limit of the aforementioned range, curability of the composition is improved, and when the content of component (B) is not more than the upper limit of the aforementioned range, storage stability of the composition is improved.

Component (D) serves as a main crosslinking agent of the present composition and is an organopolysiloxane having at least two silicon atom-bonded hydrogen atoms per molecule and free of alkenyl groups and silicon atom-bonded alkoxy groups. Silicon atom-bonded groups other than silicon atom-bonded hydrogen atom in component (D) are not limited, however, are exemplified by monovalent hydrocarbon groups with 1 to 12 carbon atoms which are free of aliphatic unsaturated bonds. Examples of the monovalent hydrocarbon groups include the groups described above.

While the molecular structure of component (D) is not particularly limited, examples thereof include a linear structure, partially branched linear structure, branched structure, cyclic structure, network structure, and dendritic structure.

Moreover, while not particularly limited thereto, the viscosity of component (D) at 25° C. is, for example, preferably within the range of 1 to 1,000 mPa·s, particularly preferably within the range of 1 to 500 mPa·s. This is because, if the viscosity at 25° C. is not less than the lower limit of the abovementioned range, the physical properties of the obtained cured product, particularly flexibility and elongation, may significantly increase; in contrast, if it is not more than the upper limit of the abovementioned range, handleability of the obtained composition may increase. The viscosity is measured by using a rotational viscometer according to ASTM D 1084.

Examples of the organopolysiloxanes for component (D) include a methylhydrogenpolysiloxane capped at both molecular chain terminals with trimethylsiloxy groups, a copolymer of methylhydrogensiloxane and dimethylsiloxane capped at both molecular chain terminals with trimethylsiloxy groups, a copolymer of methylhydrogensiloxane and dimethylsiloxane capped at both molecular chain terminals with dimethylhydrogensiloxy groups, and mixtures of two or more of these organopolysiloxanes.

The content of component (D) is in a range of from about 0.1 to about 20 parts by mass, preferably in a range of from about 0.1 to about 10 parts by mass, alternatively in a range of from about 0.5 to about 10 parts by mass or alternatively in a range of from about 1 to about 5 parts by mass, per 100 parts by mass of component (A). This is because when the content of component (D) is not less than the lower limit of the aforementioned range, curability of the composition is improved, and when the content of component (D) is not more than the upper limit of the aforementioned range, thermal shock stability of the cured product is improved.

However, a mole ratio of the silicon atom-bonded hydrogen atoms in components (B), (C) and (D) with respect to the alkenyl groups in component (A) is in a range of from about 0.2 to about 0.9, preferably in a range of from about 0.3 to about 0.8, or alternatively in a range of from about 0.4 to about 0.8. This is because, if the ratio is not less than the lower limit of the aforementioned range, the obtained composition becomes sufficiently cured; in contrast, if it is not more than the upper limit of the aforementioned range, thermal shock stability of the cured product is increase.

The present composition further comprises two different curing catalysts: (E) a hydrosilylation reaction catalyst and (F) a condensation reaction catalyst. The technical effects are achieved such that when such two catalysts are used in combination with components (A) to (D), they are easily cured by warming at from room temperature to 50° C., and have excellent adhesiveness to various base materials.

Component (E) serves as a component for promoting the hydrosilylation reaction and curing the present composition. Exemplary such component (E) may include platinum base catalysts such as platinum black, platinum-supporting activated carbon, platinum-supporting silica fine powder, chloroplatinic acid, alcohol solutions of chloroplatinic acid, olefin complexes of platinum, and vinylsiloxane complexes of platinum; palladium base catalysts such as tetrakis(triphenylphosphine)palladium; and rhodium base catalysts. In particular, component (E) is preferably a platinum base catalyst.

The amount of component (E) is a catalyst amount, can be appropriately selected in accordance with the desired curing conditions, and is generally within the range of approximately 1 to 1000 ppm of metal atom in component (E) in mass unit with respect to component (A). In addition, in terms of improving the handleability as well as the pot life of the composition, a platinum base catalyst in fine particles dispersed and encapsulated with thermoplastic resin may be used. Note that as a catalyst for promoting a hydrosilylation reaction, a nonplatinum base metal catalyst such as iron, ruthenium, and iron/cobalt may be used.

When component (F) is used in combination with component (E), the curability of the present composition in warming at from room temperature to 50° C., as well as the adhesiveness to various base materials, can be improved.

Exemplary components (F) may include, for example: tin compounds such as dimethyltin dineodecanoate and stannous octoate; titanium compounds such as tetra(isopropoxy) titanium, tetra(n-butoxy)titanium, tetra(t-butoxy)titanium, di(isopropoxy)bis(ethylacetoacetate)titanium, di(isopropoxy)bis(methylacetoacetate)titanium, titaniumtetraacetylacetonate, and di(isopropoxy)bis(acetylacetonate)titanium; aluminum compounds such as aluminum trisacetylacetonate, aluminum trisacetriacetate, and tris(sec-butoxy)aluminum; nickel compounds such as nickel bisacetylacetonate; cobalt compounds such as cobalt trisacetylacetonate; zinc compounds such as zinc bisacetylacetonate; and zirconium compounds such as zirconium tetra-n-propoxide, zirconium tetra-n-butoxide, zirconium tetraacetylacetonate, zirconium tributoxymonoacetylacetonate, zirconium monobutoxyacetylacetonate, zirconium di butoxybis(ethylacetoacetate), zirconium tetraacetylacetonate, and zirconium tributoxymono stearate.

The amount of component (F) is a catalyst amount, can be appropriately selected in accordance with the desired curing conditions, and is generally within the range of 0.01 to 5 parts by mass with respect to 100 parts by mass of component (A).

As any component to enhance the storage stability and handleability as well as improve pot life, such a composition according to the present invention may comprise curing inhibitors including: acetylene based compounds such as 2-methyl-3-butyn-2-ol, 3,5-dimethyl-1-hexyn-3-ol, 2-phenyl-3-butyn-2-ol, and 1-ethynylcyclohexanol; ene-yne compounds such as 3-methyl-3-penten-1-yne and 3,5-dimethyl-3-hexen-1-yne; 1,3,5,7-tetramethyl-1,3,5,7-tetravinylcyclotetrasiloxane, and 1,3,5,7-tetramethyl-1,3,5,7-tetrahexenylcyclotetrasiloxane; triazoles such as benzotriazole; phosphine; mercaptans; and hydrazines.

The content of these curing inhibitors should be appropriately selected based on the curing conditions of the present composition, and is, for example, preferably within the range of 0.001 to 5 parts by mass with respect to 100 parts by mass of component (A).

The present composition may further comprise (G) an adhesion promoter. Component (G), independently or as only two kinds, improves the adhesiveness of the cured product obtained by curing the present composition.

Examples of component (G) include reaction products or mixtures of amino group-containing alkoxysilanes and epoxy group-containing compounds; organic compounds having at least two alkoxysilyl groups per molecule; alkoxysilanes or partially hydrolyzed condensate thereof.

Examples of reaction products of amino group-containing alkoxysilanes and epoxy group-containing compounds for component (G) include carbasilatrane derivatives such as those mentioned below.

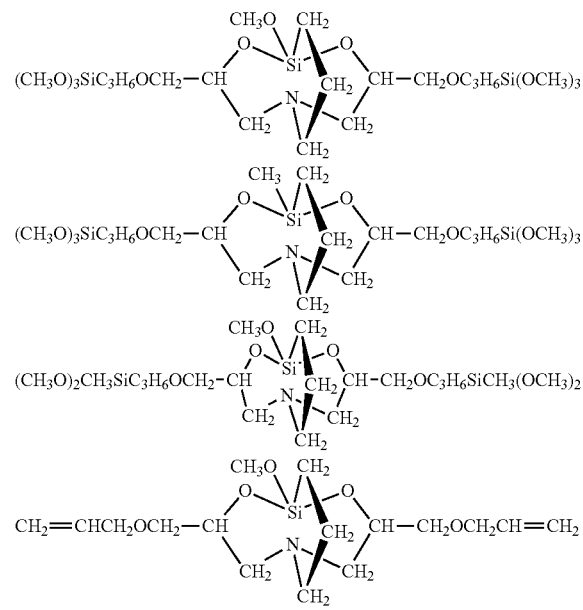

Methods for synthesizing such carbasilatrane derivatives are known. The disclosures of Japanese Patent No. 3831481 B2 and U.S. Pat. No. 8,101,677 B2 are incorporated herein by reference to show the preparation of the carbasilatrane derivatives.

Examples of the organic compounds for component (G) include 1,6-bis(trimethoxysilyl)hexane, 1,6-bis(triethoxysilyl)hexane, 1,4-bis(trimethoxysilyl)hexane, 1,5-bis(trimethoxysilyl)hexane, 2,5-bis(trimethoxysilyl)hexane, 1-methyldimethoxysilyl-6-trimethoxysilylhexane, 1-phenyldiethoxysilyl-6-triethoxysilylhexane, and 1,6-bis(methyldimethoxysilyl)hexane.

Examples of alkoxysilanes for component (G) include 3-glycidoxyprolyltrimethoxysilane, 3-glycidoxypropylmethyldimethoxysilane, 2-(3,4-epoxycyclohexyl)ethyltrimethoxysilane, 2-(3,4-epoxycyclohexyl)ethylmethyldimethoxysilane, methyltrimethoxysilane, methyl triethoxysilane, ethyltrimethoxylane, ethyltriethoxysilane, vinyltrimethoxysilane, phenyltrimethoxysilane, tetramethoxysilane, tetraethoxysilane, 3-methacryloxypropyltrimethoxysilane, 3-methacryloxypropyltriethoxysilane, 3-methacryloxypropylmethyldimethoxysilane, 3-acryloxypropyltrimethoxysilane, and 3-acryloxypropylmethyldimethoxysilane.

The content of component (G) is not limited, but it is preferably in a range of from about 0.1 to about 10 parts by mass, preferably in a range of from about 0.1 to about 5 parts by mass, or alternatively in a range of from about 0.1 to about 3 parts by mass, per 100 parts by mass of component (A). This is because when the content of component (G) is not less than the lower limit of the aforementioned range, adhesion property of the cured product is further improved, and when the content of component (G) is not more than the upper limit of the aforementioned range, storage stability of the composition is improved.

The present composition may further comprise (H) an inorganic filler. Component (H) is preferably one or more selected from a reinforcing filler, a thermally conductive filler, or a conductive filler, preferably containing a reinforcing filler particularly when the present composition is used in the application of a encapsulant or sealant.

The reinforcing filler is a component which imparts mechanical strength to the cured product obtained by curing the present composition and improving the performance as a protectant or adhesive. Exemplary reinforcing fillers may include, for example, inorganic fillers such as fumed silica fine powder, precipitated silica fine powder, burned silica fine powder, fumed titanium dioxide fine powder, quartz fine powder, calcium carbonate fine powder, diatomaceous earth fine powder, aluminum oxide fine powder, aluminum hydroxide fine powder, zinc oxide fine powder, and zinc carbonate fine powder, with these inorganic fillers capable of containing inorganic fillers surface treated with treatment agents including organoalkoxysilanes such as a methyltrimethoxysilane, organohalosilanes such as a trimethylchlorosilane, organosilazanes such as a hexamethyldisilazane, and siloxane oligomers such as a dimethylsiloxane oligomer blocked by an α,ω-silanol group, a methylphenylsiloxane oligomer blocked by an α,ω-silanol group, and a methylvinylsiloxane oligomer blocked by an α,ω-silanol group. In particular, by treating the surface of component (H) in advance with an organopolysiloxane of a low degree of polymerization having a silanol group at both terminals of a molecular chain (suitably, a dimethylpolysiloxane blocked by an α,ω-silanol group not having reactive functional groups other than this terminal silanol group in molecules), excellent initial adhesiveness, adhesive durability, and adhesive strength at room temperature can be achieved, with further sufficient usable time (storage period, handling operation time, and pot life) capable of being ensured.

While not particularly limited thereto, the particle diameter of fine powder of the reinforcing filler may be, for example, within the range of 0.01 μm to 1000 μm at the median diameter based on the laser diffraction/scattering type particle size distribution measurement.

While not limited thereto, the content of the reinforcing filler is preferably within the range of 0.1 to 200 parts by mass with respect to 100 parts by mass of component (A).

The thermally conductive filler or the conductive filler is a component which imparts thermal conductivity or electric conductivity to the silicone rubber cured product obtained by curing the present composition as desired, with examples thereof including: metal fine powder such as gold, silver, nickel, and copper; fine powder obtained by depositing or plating metals such as gold, silver, nickel, or copper on the surface of fine powder such as ceramics, glass, quartz, or organic resin; a metal compound such as aluminum oxide, aluminum nitride, or zinc oxide, as well as mixtures of two or more thereof. Silver powder, aluminum powder, aluminum oxide powder, zinc oxide powder, aluminum nitride powder, or graphite is particularly suitable. Moreover, if electric insulation is required in the present composition, metal oxide based powder or metal nitride based powder is preferable, with aluminum oxide powder, zinc oxide powder, or aluminum nitride powder particularly preferable.

The average particle diameter of such a thermally conductive filler or conductive filler, as the median diameter, is preferably within the range of 1 to 100 μm, particularly preferably within the range of 1 to 50 μm.

While not limited thereto, the content of the thermally conductive filler or conductive filler is preferably within the range of 100 to 2,500 parts by mass with respect to 100 parts by mass of component (A).

Moreover, the present composition may optionally contain: organic solvents such as toluene, xylene, acetone, methylethyl ketone, methylisobutyl ketone, hexane, and heptane; non-crosslinkable diorganopolysiloxanes such as a dimethylpolysiloxane capped at both molecular chain terminals with trimethylsiloxy groups and a methylphenylpolysiloxane capped at both molecular chain terminals with trimethylsiloxy groups; flame retardants such as carbon black; antioxidants such as a hindered phenol based antioxidant; heat resistant agents such as iron oxide; plasticizers such as a dialkylsiloxane oligomer blocked by a hydroxydialkylsiloxy group at both terminals of a molecular chain; and other pigments, thixotropy imparting agents, and antifungal agents, as long as the present composition does not impair the object of the present invention.

The present composition can be produced by uniformly mixing components mentioned above. Although the method for mixing each component may be a conventionally known method and is not particularly limited, a uniform mixture is generally made by simple stirring. Moreover, if a solid component such as an inorganic filler is contained as any component, mixing using a mixing apparatus is more preferable. While not particularly limited thereto, exemplary such mixing apparatuses may include a single or twin shaft continuous mixer, two rolls, Ross mixer, Hobart mixer, dental mixer, planetary mixer, kneader mixer, Henschel mixer, etc.

The present composition can be used as a one-liquid curable organopolysiloxane composition; however, because it uniformly cures both the surface layer and the inside regardless of the moisture and water content in the atmosphere, it is desirably a multi-component type, particularly suitably a two-liquid type curable organopolysiloxane composition.

More specifically, the present composition can be produced by uniformly mixing components (A) to (G), and if necessary, component (H) and other arbitrary components under moisture blocking.

In the case of the two-liquid type curable organopolysiloxane composition, a one-liquid component contains at least said said components (E) and (F), and optionally contains part of component (A), while another-liquid component contains at least components (B), (C), and (D), as well as the remaining amount of component (A).

Both the one-liquid component and the other-liquid component can be encapsulated in a sealed container under moisture blocking so as to be capable of being stored for extended periods of time, wherein the one-liquid component and the other-liquid component can be mixed and then rapidly cured under warming at room temperature or 50° C. or lower to form a silicone rubber.

The present composition is favorably adhered to various adherends or base bodies. Exemplary adherends or base bodies may include adherends or base bodies made of glass, ceramics, mortar, concrete, wood, aluminum, copper, brass, zinc, silver, a stainless steel, iron, galvanized iron, tin plate, nickel plating surface, epoxy resin, phenol resin, etc. Moreover, examples thereof may also include adherends or base bodies made of thermoplastic resins such as polycarbonate resin, polyester resin, ABS resin, nylon resin, polyvinyl chloride resin, polyphenylene sulfide resin, polyphenylene ether resin, or polybutylene terephthalate resin. Moreover, if firmer adhesiveness is required, the abovementioned adhesion promoter may be blended, and in addition, an appropriate primer may be applied to the surfaces of these adherends or base bodies, with the present composition capable of being adhered to the primer application surface.

A multi-component type curable organopolysiloxane composition according to the present invention is suitable as a building member and as a sealing material, potting material, sealing material, or adhesive of electric/electronic parts and vehicle parts. Specifically, it can be suitably used as a sealing agent for adhering glass, a sealing material of a bathtub unit, an adhesive and sealing material for illumination parts of a vehicle such as an automobile, a protectant or adhesive of electric/electronic parts (a sealing material, coating material, potting agent, or adhesive), etc.

The present composition has an excellent effect of improving initial adhesiveness to various base materials it contacts during curing, particularly to an organic resin such as an uncleaned aluminum die cast, polybutylene terephthalate (PBT) resin, and polyphenylene sulfide (PPS) resin, has particularly excellent adhesive durability and can achieve high adhesive strength after curing, and accordingly is particularly useful as a protectant or adhesive composition of electric/electronic equipment.

The present composition enables the provision of a cured product including electric/electronic equipment. In particular, due to the abovementioned configuration, characteristically, the present composition, even in small amounts and a thin layer, is firmly initially adhered to an adherend, in addition to being able to achieve high adhesive strength. Therefore, an adhesive layer including the present composition has a firm bond to the adherend and forms an adhesive/adhesion state (a cohesive failure mode upon forcibly tearing off) which is difficult to tear off by interfacial peeling, etc. Specifically, when a cured layer has a thickness of 10 to 500 μm, the present composition can adhere or protect various base materials and is useful as an adhesive or protectant used in an adhesive form different from conventional ones in adhesion in small amounts, adhesion in a thin layer, in complicated shapes, etc. In particular, it is suitably utilized for electric/electronic equipment including an adhesive layer or protective layer, wherein the cured layer has a thickness of 10 to 500 μm, suitably 50 to 300 μm. Moreover, because the present composition exerts high initial adhesiveness and adhesive strength to the adherend in adhesive forms other than thin layer adhesion, it is also useful as a conventionally used thick coating, potting agent, encapsulant, or sealant, and enables the provision of electric/electronic equipment including an adhesive layer or protective layer.

The electric/electronic parts according to the present invention are not particularly limited unless they are encapsulated or sealed by the present composition, with examples thereof including electronic equipment including an electric circuit or electrode, etc. wherein a metal electrode (such as silver, copper, aluminum, or gold) and a metal oxide film electrode (such as ITO (Indium Tin Oxide)) are formed on base materials of glass, epoxy resin, polyimide resin, phenol resin, ceramics, etc. Because the protectant or adhesive composition including the present composition has an excellent effect of improving initial adhesiveness, in addition to being able to achieve particularly excellent adhesive durability and high adhesive strength after curing, it can improve the reliability and durability of these electric/electronic equipment if used as an adhesive, potting material, coating material, or sealing material, etc. to protect or adhere electric/electronic parts. In particular, it can be suitably used to form the waterproof structure of an electronic circuit board, etc.

More specifically, the protectant or adhesive composition of electric/electronic parts according to the present invention is useful as a sealing material of a structure made of metal and/or resin requiring durability, water resistance, etc., such as peripheral parts, onboard parts cases, terminal boxes, illumination parts, and solar cell modules of electric/electronic equipment, and has excellent initial adhesiveness and adhesive durability, for example, when applied to a circuit board and housing case thereof in the application of power semiconductors such as engine controls (in a transport machine), power/train systems, and air conditioner controls. Further, advantageously, when it is also incorporated into onboard electronic parts such as an electronic control unit (ECU) and used under harsh environments, excellent adhesive durability is achieved, while the reliability and durability of these power semiconductors, onboard parts, etc., as well as water resistance to rainwater, etc., can be improved.

EXAMPLES

The curable organopolysiloxane composition, cured product and electric/electronic equipment of the present invention will be described in detail hereinafter using Practical Examples and Comparative Examples. However, the present invention is not limited by the description of the below listed Practical Examples. Viscosities were measured at 25° C.

Practical Examples 1-3 and Comparative Examples 1-2

The curable organopolysiloxane compositions shown in Table 1 were prepared using the components mentioned below. Moreover, in Table 1, "SiH/Vi" represents the total moles of silicon-bonded hydrogen atoms in components (B), (C) and (D) per 1 mole of total vinyl groups in component (A).

The following component was used as component (A).
Component (a-1): a dimethylpolysiloxane capped at both molecular chain terminals with dimethylvinylsiloxy groups and having a viscosity of 248 mPa·s (content of vinyl groups: 0.62 mass %)
Component (a-2): a dimethylpolysiloxane capped at both molecular chain terminals with dimethylvinylsiloxy groups and having a viscosity of 450 mPa·s (content of vinyl groups: 0.42 mass %)
The following component was used as component (B).
Component (b-1): an organotrisiloxane represented by the following formula:

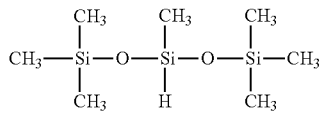

and having a content of silicon-bonded hydrogen atoms: 0.45 mass %
The following component was used as component (C).
Component (c-1): an organosiloxane represented by the following formula:

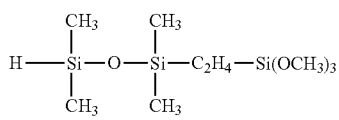

and having a content of silicon-bonded hydrogen atoms: 0.36 mass %
The following components were used as component (D).
Component (d-1): a copolymer of dimethylsiloxane and methylhydrogensiloxane capped at both molecular chain terminals with trimethylsiloxy groups and having a viscosity of 150 mPa·s, and having a content of silicon-bonded hydrogen atoms: 0.15 mass %
Component (d-2): a dimethylpolysiloxane capped at both molecular chain terminals with dimethylhydrogensiloxy groups and having a viscosity of 14 mPa·s, and having a content of silicon-bonded hydrogen atoms: 0.15 mass %
The following component was used as component (E).
Component (e-1): 1,3-divinyl-1,1,3,3-tetramethyldisiloxane solution of platinum-1,3-divinyl-1,1,3,3-tetramethyldisiloxane complex (platinum metal content=approximately 5,000 ppm by mass)
The following component was used as component (F).
Component (f-1): a mixture of 47 mass % of methyltrimethoxysilane, 45 mass % of diisopropoxy titanium bis (ethylacetoacetate), and 7 mass % of a cabasilatran derivative represented by the following formula:

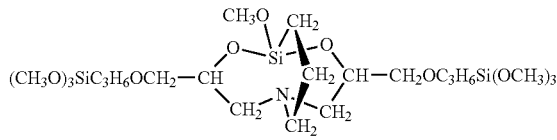

The following component was used as component (G).
Component (g-1): methyl trimethoxysilane
The following component was used as component (H).
Component (h-1): a quart powder having an average particle size of approximately 3 μm
The following component was used as other component (I).
Component (i-1): a mixture of 50 mass % of carbon black and 50 mass % of a dimethylpolysiloxane capped at both molecular chain terminals with dimethylvinylsiloxy groups and having a viscosity of 2,000 mPa·s (content of vinyl groups: 0.23 mass %)
The properties reported in Table 1 were measured by the following methods.
<Shore 00 Hardness>
A cured product was obtained by heat curing the curable organopolysiloxane composition for 1 hour at 60° C. in an air circulating oven. The cured products were stacked to be at least 6 mm in thickness for durometer measurement. The Shore 00 hardness of the cured product at 25° C. was determined according to test method ASTM D2240-05 (2010) (Standard Test Method for Rubber Property Durometer Hardness).

<Thermal Shock Test>

18 ml of the curable organopolysiloxane composition was poured into a glass bottle with a diameter of 22 mm and a height of 84 mm. The curable organopolysiloxane composition was cured for 1 hour at 60° C. in an air circulating oven. Then, the cured product in the glass bottle was put into a thermal shock chamber with a one cycle (−40° C.↔125° C., stayed at −40° C. and 125° C. for 30 minutes each) for reliability testing. After thermal shock test of 360 cycles, the cured product was observed visually.

TABLE 1

|  |  |  | Practical Examples | | | Comparative Examples | |
|---|---|---|---|---|---|---|---|
|  |  |  | 1 | 2 | 3 | 1 | 2 |
| Curable | (A) | (a-1) | 76.2 | 76.2 | 76.2 | 76.2 | 76.2 |
| Organopolysiloxane | | (a-2) | 7.9 | 7.9 | 7.9 | 7.9 | 7.9 |
| Compositions | (B) | (b-1) | 0.8 | 0.8 | 0.8 | 0 | 6.0 |
| (parts by mass) | (C) | (c-1) | 0.4 | 0.4 | 0.4 | 0.8 | 0.4 |
|  | (D) | (d-1) | 1.75 | 3.5 | 4.64 | 4.6 | 1.7 |
|  |  | (d-2) | 1.1 | 2.2 | 2.88 | 2.8 | 1.1 |
|  | (E) | (e-2) | 0.2 | 0.2 | 0.2 | 0.2 | 0.2 |
|  | (F) | (f-1) | 0.4 | 0.4 | 0.4 | 0.4 | 0.4 |
|  | (G) | (g-1) | 0.4 | 0.4 | 0.4 | 0.4 | 0.4 |
|  | (H) | (h-1) | 106.0 | 106.0 | 106.0 | 106.0 | 106.0 |
|  | (I) | (i-1) | 2.0 | 2.0 | 2.0 | 2.0 | 2.0 |
| SiH/Vi | | | 0.5 | 0.7 | 0.8 | 0.7 | 1.7 |
| Properties of Cured Products | Shore 00 Hardness | | 10 | 30 | 60 | 68 | Not cured |
|  | Appearance after thermal shock test | | Good | Good | Good | Crack and delamination | Not applicable |

As is clear from the results in Table 1, it was found that the cured products of the curable organopolysiloxane compositions prepared in Practical Examples 1 to 3 exhibited excellent thermal shock stability because of containing a specific amount of component (B) compared to those the curable organopolysiloxane compositions prepared in Comparative Examples 1 to 2.

INDUSTRIAL APPLICABILITY

Since the curable organopolysiloxane composition according to the present invention is cured to form a low-hardness silicone rubber, exhibits excellent initial adhesiveness to various substrates it contacts during curing, and exhibits excellent thermal shock stability, the curable organopolysiloxane composition is useful as encapsulants or sealants for power devices such as motor control, motor control for a transport machine, a power generation system, or a space transport system.

The invention claimed is:

1. A curable organopolysiloxane composition, comprising:
   (A) 100 parts by mass of an organopolysiloxane having at least two alkenyl groups with 2 to 12 carbon atoms per molecule;
   (B) 0.05 to 5 parts by mass of an organosiloxane having one silicon atom-bonded hydrogen atom per molecule and free of alkenyl groups and silicon atom-bonded alkoxy groups;
   (C) 0.01 to 10 parts by mass of an organosiloxane having one silicon atom-bonded hydrogen atom and at least one silicon atom-bonded alkoxy group per molecule and free of alkenyl groups;
   (D) 0.1 to 20 parts by mass of an organopolysiloxane having at least two silicon atom-bonded hydrogen atoms per molecule and free of alkenyl groups and silicon atom-bonded alkoxy groups;
   (E) a catalytic amount of a hydrosilylation reaction catalyst; and
   (F) a catalytic amount of a condensation reaction catalyst;
   wherein a mole ratio of the silicon atom-bonded hydrogen atoms in components (B), (C) and (D) with respect to the alkenyl groups in component (A) is in a range of 0.2 to 0.9.

2. The curable organopolysiloxane composition according to claim 1, wherein component (B) is an organosiloxane represented by the following general formula:

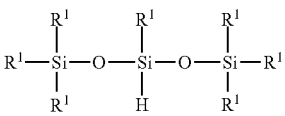

wherein each $R^1$ is the same or different monovalent hydrocarbon group with 1 to 12 carbon atoms and free of an aliphatic unsaturated bond.

3. The curable organopolysiloxane composition according to claim 1, wherein component (C) is an organosiloxane represented by the following general formula:

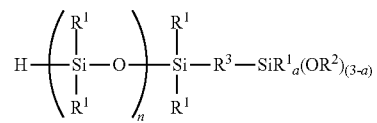

wherein each $R^1$ is the same or different monovalent hydrocarbon group with 1 to 12 carbon atoms and free of an aliphatic unsaturated bond; each $R^2$ is the same or different alkyl group with 1 to 3 carbon atoms; $R^3$ is an alkylene group with 2 to 6 carbon atoms; "a" is 0, 1 or 2; and "n" is an integer of from 1 to 50.

4. The curable organopolysiloxane composition according to claim 3, wherein component (C) is an organosiloxane represented by the following formula:

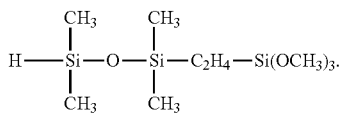

5. The curable organopolysiloxane composition according to claim 1, further comprising:

(G) an adhesion promoter, in an amount of from 0.1 to 10 parts by mass relative to 100 parts by mass of component (A).

6. The curable organopolysiloxane composition according to claim 1, further comprising:

(H) an inorganic filler, in an amount of from 1 to 200 parts by mass relative to 100 parts by mass of component (A).

7. The curable organopolysiloxane composition according to claim 1, suitable for use as an encapsulant or a sealant of an electric/electronic equipment.

8. A cured product obtained by curing the curable organopolysiloxane composition according to claim 1.

9. The cured product according to claim 8, having a Shore 00 hardness of from 10 to 60.

10. An electric/electronic equipment, comprising:

a cured product obtained by curing the curable organopolysiloxane composition according to claim 1.

11. The curable organopolysiloxane composition according to claim 1, wherein component (B) comprises exactly one silicon atom-bonded hydrogen atom per molecule.

12. The curable organopolysiloxane composition according to claim 1, wherein component (B) is an organosiloxane represented by the following formula:

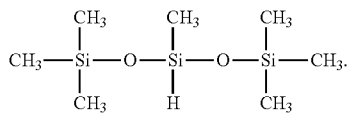

* * * * *